United States Patent
Lee

(10) Patent No.: US 12,060,976 B2
(45) Date of Patent: Aug. 13, 2024

(54) FUEL SUPPLY DEVICE

(71) Applicants: Hyundai Motor Company, Seoul (KR); Kia Corporation, Seoul (KR)

(72) Inventor: Jae Jun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 58 days.

(21) Appl. No.: 18/079,633

(22) Filed: Dec. 12, 2022

(65) Prior Publication Data

US 2024/0003498 A1    Jan. 4, 2024

(30) Foreign Application Priority Data

Jul. 4, 2022   (KR) ........................ 10-2022-0081937

(51) Int. Cl.
| | | |
|---|---|---|
| *F17C 13/04* | (2006.01) | |
| *G05D 7/06* | (2006.01) | |
| *H01M 8/04082* | (2016.01) | |
| *H01M 8/0438* | (2016.01) | |
| *H01M 8/04746* | (2016.01) | |

(52) U.S. Cl.
CPC ........... *F17C 13/04* (2013.01); *G05D 7/0635* (2013.01); *H01M 8/04201* (2013.01); *H01M 8/0438* (2013.01); *H01M 8/04753* (2013.01); *F17C 2205/0326* (2013.01); *F17C 2205/0338* (2013.01); *F17C 2205/0352* (2013.01); *F17C 2221/012* (2013.01); *F17C 2250/03* (2013.01); *F17C 2250/043* (2013.01); *F17C 2250/0636* (2013.01); *F17C 2265/061* (2013.01); *F17C 2270/0184* (2013.01); *H01M 2250/20* (2013.01)

(58) Field of Classification Search
CPC .............. F17C 13/04; F17C 2205/0326; F17C 2205/0338; F17C 2205/0352; F17C 2221/012; F17C 2250/03; F17C 2250/043; F17C 2250/0636; F17C 2265/061; F17C 2270/0184; G05D 7/0635; H01M 8/04201; H01M 8/0438; H01M 8/04753; H01M 2250/20
USPC ......................................................... 137/494
See application file for complete search history.

(56) References Cited

U.S. PATENT DOCUMENTS

| | | | |
|---|---|---|---|
| 9,217,539 B2 | 12/2015 | Ishitoya et al. | |
| 10,295,121 B2 * | 5/2019 | Handa | ............... F17C 13/028 |
| 2007/0000561 A1 * | 1/2007 | Handa | ............... F17C 5/007 |
| | | | 141/82 |
| 2009/0014089 A1 * | 1/2009 | Takeshita | ............... F17C 13/04 |
| | | | 141/192 |

(Continued)

FOREIGN PATENT DOCUMENTS

JP          5161656 B     3/2013

*Primary Examiner* — Minh Q Le
(74) *Attorney, Agent, or Firm* — Fish & Richardson P.C.

(57) ABSTRACT

A fuel supply device includes a fuel tank having an internal space configured to store fuel, a tube member having a flow path therein and having one side connected to the fuel tank and the other side connectable to an external component, and an opening/closing control unit coupled to the tube member and configured to control an operation of opening or closing the flow path of the tube member. The opening/closing control unit is configured to close the flow path of the tube member based on a rate (dP/dt) of pressure change over time of the fluid being greater than or equal to a predetermined value.

13 Claims, 5 Drawing Sheets

(56) References Cited

U.S. PATENT DOCUMENTS

| | | | |
|---|---|---|---|
| 2009/0117420 A1* | 5/2009 | Nakakubo | H01M 8/04388 |
| | | | 429/410 |
| 2010/0323252 A1* | 12/2010 | Kobayashi | H01M 8/04425 |
| | | | 429/415 |
| 2012/0291902 A1* | 11/2012 | Mori | F17C 5/06 |
| | | | 138/40 |
| 2013/0052557 A1* | 2/2013 | Okawachi | H01M 8/04373 |
| | | | 429/444 |
| 2013/0087244 A1* | 4/2013 | Maier | G02F 1/1303 |
| | | | 141/94 |
| 2017/0012306 A1* | 1/2017 | Metkemeijer | H01M 8/04753 |
| 2017/0074456 A1* | 3/2017 | Handa | F17C 1/005 |
| 2017/0074458 A1* | 3/2017 | Handa | F17C 5/06 |
| 2022/0193600 A1* | 6/2022 | Maehara | F17C 7/00 |
| 2022/0290811 A1* | 9/2022 | Yoon | F17C 5/06 |
| 2022/0341546 A1* | 10/2022 | Jung | H01M 8/04007 |
| 2023/0119413 A1* | 4/2023 | Handa | F17C 5/06 |
| | | | 700/282 |
| 2023/0187666 A1* | 6/2023 | Choi | H01M 8/04425 |
| | | | 429/429 |
| 2023/0204158 A1* | 6/2023 | Handa | F17C 5/06 |
| | | | 141/4 |
| 2023/0366513 A1* | 11/2023 | Minas | F17C 13/04 |
| 2023/0400152 A1* | 12/2023 | Ogiwara | F17C 5/007 |

* cited by examiner

FUEL SUPPLY DEVICE

CROSS-REFERENCE TO RELATED APPLICATION

This application claims priority to and the benefit of Korean Patent Application No. 10-2022-0081937 filed in the Korean Intellectual Property Office on Jul. 4, 2022, the entire contents of which are incorporated herein by reference.

TECHNICAL FIELD

The present disclosure relates to a fuel supply device, and more particularly, to a fuel supply device capable of supplying hydrogen as fuel.

BACKGROUND ART

A hydrogen storage system stores hydrogen as fuel and supplies, as necessary, hydrogen to a demander (e.g., a fuel cell) that uses fuel. The hydrogen storage system generally includes a hydrogen storage tank having a space capable of storing hydrogen, a connection tube configured to connect the hydrogen storage tank and an external dispenser, and a regulator disposed in the connection tube. In general, high-pressure hydrogen is stored in the hydrogen storage tank. The hydrogen discharged from the hydrogen storage tank is decompressed by the regulator and then supplied to the fuel demander through the connection tube.

In some cases, as described above, the hydrogen storage tank may be connected to the external dispenser through the connection tube, and the hydrogen storage tank is charged with hydrogen through the dispenser. However, because the dispenser is connected not only to the hydrogen tank but also to the regulator through the connection tube, a pressure of hydrogen, which is being stored, is also applied to the regulator while the hydrogen storage tank is charged with the hydrogen through the dispenser.

In this case, hydrogen need not leak from the regulator while the hydrogen storage tank is charged with the hydrogen. However, in the related art, there is a problem in that hydrogen leaks from the regulator because of pulsation caused by the hydrogen supplied from the dispenser.

SUMMARY

The present disclosure has been made in an effort to provide a fuel supply device capable of stably charging a fuel tank with fuel such as hydrogen by preventing a leak of the fuel from a component such as a regulator configured to be sealed during the process of charging the fuel tank with the fuel such as hydrogen.

An aspect of the present disclosure provides a fuel supply device including: a fuel tank having an internal space configured to store fuel; a tube member having a flow path therein and having one side connected to the fuel tank; and an opening/closing control unit coupled to the tube member and configured to control an operation of opening or closing the flow path of the tube member, in which the opening/closing control unit closes the flow path of the tube member when a rate (dP/dt) of change over time in pressure applied to the opening/closing control unit by a fluid flowing through the flow path is a predetermined value or higher.

The opening/closing control unit may further include: a piezoelectric element connected to the tube member and having one side connected to the flow path; and a valve member electrically connected to the piezoelectric element and coupled to one side of the tube member, the piezoelectric element may generate electric power when a rate (dP/dt) of change over time in pressure applied to the piezoelectric element by the fluid flowing through the flow path is the predetermined value or higher, and the valve member may be configured to close the flow path of the tube member by receiving the electric power generated by the piezoelectric element.

The opening/closing control unit may further include an electric wire member configured to electrically connect the piezoelectric element and the valve member.

The valve member may be a solenoid valve, the solenoid valve may include a plunger member configured to be movable relative to the tube member, and the solenoid valve may be configured to close the flow path by moving the plunger member by receiving the electric power generated by the piezoelectric element.

The fuel supply device may further include a regulator connected to the other side of the tube member.

The fuel supply device may further include a connection component connected to the other side of the tube member, in which the connection component may include a gastight seal.

The opening/closing control unit may be coupled to a region of the tube member that connects the fuel tank and the regulator based on a flow direction of the fuel supplied from the fuel tank to the regulator.

The fuel supply device may further include a fuel demander configured to receive the fuel through the tube member, in which the opening/closing control unit closes the flow path of the tube member when the rate (dP/dt) of change over time in pressure applied to the opening/closing control unit by the fluid flowing through the flow path at the time of supplying the fluid to the fuel tank through the tube member from the outside is higher than a rate (dP/dt) of change over time in pressure applied to the opening/closing control unit by the fluid at the time of supplying the fluid to the fuel demander through the tube member from the fuel tank.

The opening/closing control unit may close the flow path of the tube member when the rate (dP/dt) of change over time in pressure applied to the opening/closing control unit by the fluid flowing through the flow path is 1 bar/s or higher.

A distance between the regulator and a region in which the piezoelectric element is connected to the tube member may be longer than a distance between the regulator and a region in which the valve member is coupled to the tube member.

The fuel supply device may further include a check valve coupled to the tube member, in which the check valve is configured to cut off the discharge of the fuel from the fuel tank and the opening/closing control unit to the outside while allowing the supply of the fuel from the outside to the fuel tank and the opening/closing control unit.

The opening/closing control unit may include: a piezoelectric element connected to the tube member and having one side connected to the flow path; a controller connected to the piezoelectric element and configured to receive electric power generated by the piezoelectric element; a valve member connected to one side of the tube member; and an electric power supply unit having one side connected to the controller and the other side connected to the valve member, the electric power supply unit being configured to provide electric power for the valve member to open or close the flow path of the tube member, and when a rate (dP/dt) of change over time in pressure applied to the piezoelectric element by the fluid flowing through the flow path is the predetermined value or higher, i) the piezoelectric element may generate electric power and transmit the electric power to the controller, ii) the controller may transmit a signal to the electric power supply unit, iii) the electric power supply unit may supply electric power to the valve member, and iv) the valve member may close the flow path of the tube member by receiving the electric power of the electric power supply unit.

The opening/closing control unit may include: a pressure sensor configured to measure a pressure of the fluid flowing through the flow path; a controller connected to the pressure sensor and configured to receive a signal from the pressure sensor; an electric power supply unit connected to the controller and configured to receive a signal from the controller; and a valve member coupled to one side of the tube member and connected to the electric power supply unit, and when a rate (dP/dt) of change over time in pressure applied to the pressure sensor by the fluid flowing through the flow path is the predetermined value or higher, i) the pressure sensor may transmit a signal to the controller, ii) the controller may transmit a signal to the electric power supply unit, iii) the electric power supply unit may supply electric power to the valve member, and iv) the valve member may operate to close the flow path of the tube member by receiving the electric power of the electric power supply unit.

In some implementations, it is possible to provide the fuel supply device capable of stably charging the fuel tank with fuel such as hydrogen by preventing a leak of the fuel from a component such as the regulator configured to be sealed during the process of charging the fuel tank with the fuel such as hydrogen.

DETAILED DESCRIPTION

Hereinafter, a fuel supply device according to the present disclosure will be described with reference to the drawings.

Figure 1:
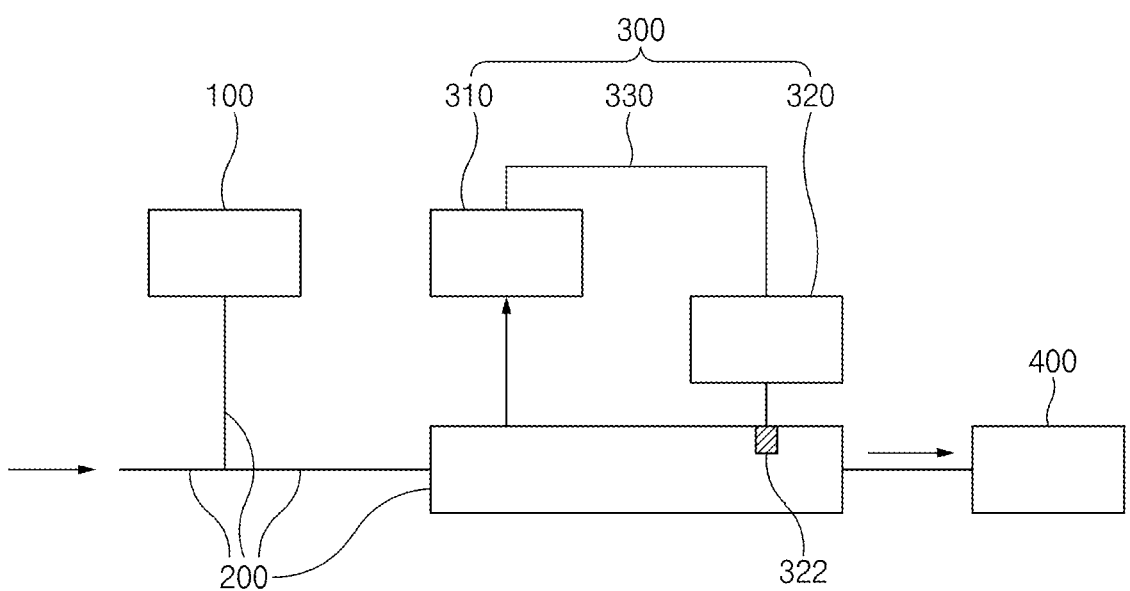
FIG. 1 is a view illustrating an example of a fuel supply device in a state before a plunger member closes a tube member.
Figure 2:
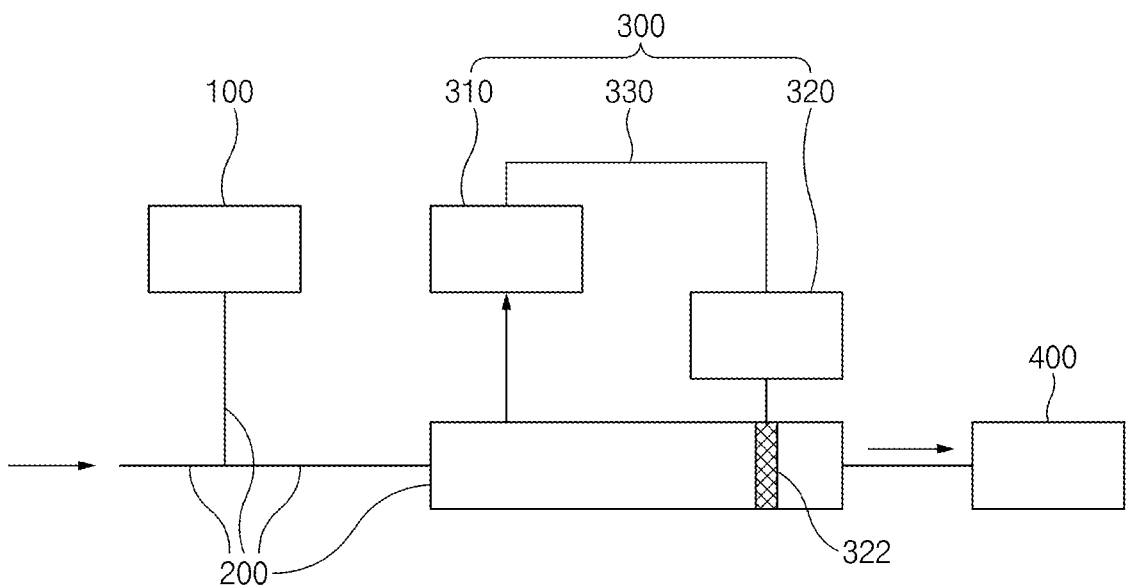
FIG. 2 is a view illustrating the fuel supply device in a state in which the plunger member closes the tube member.

FIG. 1 is a view illustrating an example structure of a fuel supply device in a state before a plunger member closes a tube member, and FIG. 2 is a view illustrating the structure of the fuel supply device and illustrating a state in which the plunger member closes the tube member.

In some implementations, a fuel supply device 10 may be configured to receive fuel from the outside and supply the received fuel to a fuel demander (e.g., a fuel cell) of an apparatus (e.g., a vehicle) equipped with the fuel supply device 10. For example, the fuel may be hydrogen, but the type of fuel is not limited to the hydrogen.

For example, referring to FIGS. 1 and 2, the fuel supply device 10 may include: a fuel tank 100 having an internal space configured to store fuel; and a tube member 200 having a flow path therein and having one side connected to the fuel tank 100 and the other side connectable to the outside. More specifically, the fuel may be introduced into the fuel supply device 10 through the tube member 200 from an external dispenser and then supplied to the fuel tank 100. The fuel stored in the fuel tank 100 may be supplied to the fuel demander later.

In addition, the fuel supply device 10 may further include an opening/closing control unit 300 coupled to the tube member 200 and configured to control an operation of opening or closing a partial region of the flow path of the tube member 200.

Referring to FIGS. 1 and 2, the tube member 200 may include a first pipe region extending to the fuel tank 100 from one side connected to the outside, and a second pipe region diverged from the first pipe region and extending to the opening/closing control unit 300. The opening/closing control unit 300 may be configured to control the flow of fuel by selectively opening or closing a partial region of the tube member 200, more specifically, the second pipe region.

More specifically, according to the present disclosure, the opening/closing control unit 300 may close the flow path of the tube member 200 when a rate (dP/dt) of change over time in pressure applied to the opening/closing control unit 300 by a fluid flowing through the flow path of the tube member 200 is a predetermined value or higher. Therefore, according to the present disclosure, when a pressure in the flow path of the tube member 200 is rapidly changed, the flow path in the region of the tube member 200 to which the opening/closing control unit 300 is coupled may be closed, which makes it possible to prevent the fuel from being introduced through the tube member 200 into a connection component or a regulator to be described below.

In particular, the change in pressure in the flow path over time occurs when the fuel is supplied to the fuel supply device 10 from the outside. The change in pressure in the flow path is caused by pulsation of the fuel caused by the fuel supplied to the fuel supply device 10. Even though the regulator or the like has a sealing member configured to selectively open or close the flow path in the regulator as necessary, the fuel may leak from the regulator because of pulsation caused by the high-pressure fuel.

The opening/closing control unit 300 is configured to prevent the fuel from leaking because of the pulsation of the fuel from the regulator or the connection component configured to be sealed. That is, in some implementations, when the pressure is rapidly changed over time in the flow path of the tube member 200 during a process of introducing the fuel into the fuel tank 100 of the fuel supply device 10 from the outside, the opening/closing control unit 300 may close the flow path of the partial region of the tube member 200, thereby basically preventing the fluid from reaching the component such as the regulator or the connection component, which is configured to be sealed, through the flow path.

Hereinafter, a detailed configuration of the opening/closing control unit will be described.

In some implementations, the opening/closing control unit 300 may include: a piezoelectric element 310 connected to the tube member 200 and having one side connected to the flow path of the tube member 200; a valve member 320 electrically connected to the piezoelectric element 310 and coupled to one side of the tube member 200; and an electric wire member 330 configured to electrically connect the piezoelectric element 310 and the valve member 320.

In some implementations, when the rate (dP/dt) of change over time in pressure applied to the piezoelectric element 310 by the fluid flowing through the flow path of the tube member 200, more specifically, the fuel is the predetermined value or higher, the piezoelectric element 310 may generate electric power, and the valve member 320 may operate to close the flow path of the tube member 200 by receiving the electric power generated by the piezoelectric element 310. In this case, the electric power generated by the piezoelectric element 310 may be supplied to the valve member 320 through the electric wire member 330. In some examples, when the electric power is not supplied to the valve member 320 any further, the valve member 320 may open the flow path of the tube member 200 again. That is, the operation of the valve member 320 for opening or closing the flow path of the tube member 200 may be reversibly controlled based on whether the electric power is supplied to the valve member 320. In particular, the present disclosure provides the technical effect in that the operation of opening or closing the flow path of the tube member 200 may be controlled by using the electric power generated by the piezoelectric element 310 without using a separate control circuit or the like for controlling the valve member 320.

For example, the valve member 320 may be a solenoid valve, and the solenoid valve 320 may include a plunger member 322 configured to be movable relative to the tube member 200. In this case, the solenoid valve 320 may be configured to close the flow path of the tube member 200 by moving the plunger member 322 by receiving the electric power generated by the piezoelectric element 310. That is, as illustrated in FIG. 1, the flow path of the tube member 200 is not closed before the piezoelectric element 310 generates the electric power. When the piezoelectric element 310 generates the electric power, the solenoid valve 320 may receive the electric power and close the flow path of the tube member 200 by moving the plunger member 322.

In some implementations, referring to FIGS. 1 and 2, the fuel supply device 10 may further include a regulator 400 connected to the other side of the tube member 200. The regulator 400 may be configured to receive the fuel from the fuel tank 100 for storing the high-pressure fuel, decrease a pressure of the fuel, and then supply the fuel to the fuel demander such as the fuel cell.

In this case, the opening/closing control unit 300 may be coupled to the region of the tube member 200 that connects the fuel tank 100 and the regulator 400 based on a flow direction of the fuel supplied from the fuel tank 100 to the regulator 400. Therefore, when the rate (dP/dt) of change over time in pressure in the flow path exceeds the predetermined value during the process of supplying the fuel to the fuel supply device 10 from the outside, the valve member 320 of the opening/closing control unit 300 may operate to close the flow path of the tube member 200, thereby basically preventing the fuel supplied from the outside from being introduced into the regulator 400 when the fuel is supplied to the fuel tank 100.

In some examples, as illustrated in FIGS. 1 and 2, based on a direction in which the tube member 200 extends, a distance between the regulator 400 and the region in which the piezoelectric element 310 is connected to the tube member 200 may be longer than a distance between the regulator 400 and the region in which the valve member 320 is coupled to the tube member 200. It can be understood that the piezoelectric element 310 is provided to be closer to the region of the tube member 200 than the valve member 320, the region being connected to an external component for supplying the fuel.

When the rate (dP/dt) of change over time in pressure in the flow path of the tube member 200 exceeds the predetermined value as described above, the piezoelectric element 310 may generate the electric power. There is a time interval between when the electric power generated by the piezoelectric element 310 is supplied to the valve member 320 and when the valve member 320 closes the flow path of the tube member 200. Therefore, when the piezoelectric element 310 and the valve member 320 are disposed as described above and the pressure in the flow path rapidly changes, the piezoelectric element 310, which is provided to be relatively adjacent to the region of the tube member 200 that is connected to the external component, may quickly generate the electric power, and the fluid, of which the pressure has been rapidly changed, may be effectively prevented from reaching the regulator 400 until the electric power generated by the piezoelectric element 310 reaches the valve member 320 and then the valve member 320 operates to close the flow path. However, in the fuel supply device 10, the arrangements of the piezoelectric element 310 and the valve member 320 are not limited to the above-mentioned arrangements. That is, in some implementations, based on the direction in which the tube member 200 extends, the distance between the regulator 400 and the region in which the piezoelectric element 310 is connected to the tube member 200 may be shorter than the distance between the regulator 400 and the region in which the valve member 320 is coupled to the tube member 200.

In some examples, reference numeral 400, which has been described with reference to FIGS. 1 and 2, may indicate a component that is not the regulator. For example, reference numeral 400 may indicate a connection component 400 connected to the other side of the tube member 200. More specifically, the connection component 400 needs to be sealed from the outside and may include a gastight seal. For example, the connection component 400 may be a tube, a sensor, a fitting (pitting), or a ball valve disposed at a rear end of the opening/closing control unit 300 in addition to the tube member 200.

In some examples, FIGS. 1 and 2 illustrate that all the parts of the tube member 200 are connected to one another and integrated into a single component. However, the tube member 200 is not limited thereto. That is, for example, the tube member 200 may include: a first tube member having one side connected to the fuel tank 100 and the other side provided to be connectable to the external component; and a second tube member having one side connected to the fuel tank 100 and the other side connected to the connection component 400. The first tube member and the second tube member may be provided to be separable from each other and communicate with each other through the fuel tank 100.

Figure 3:
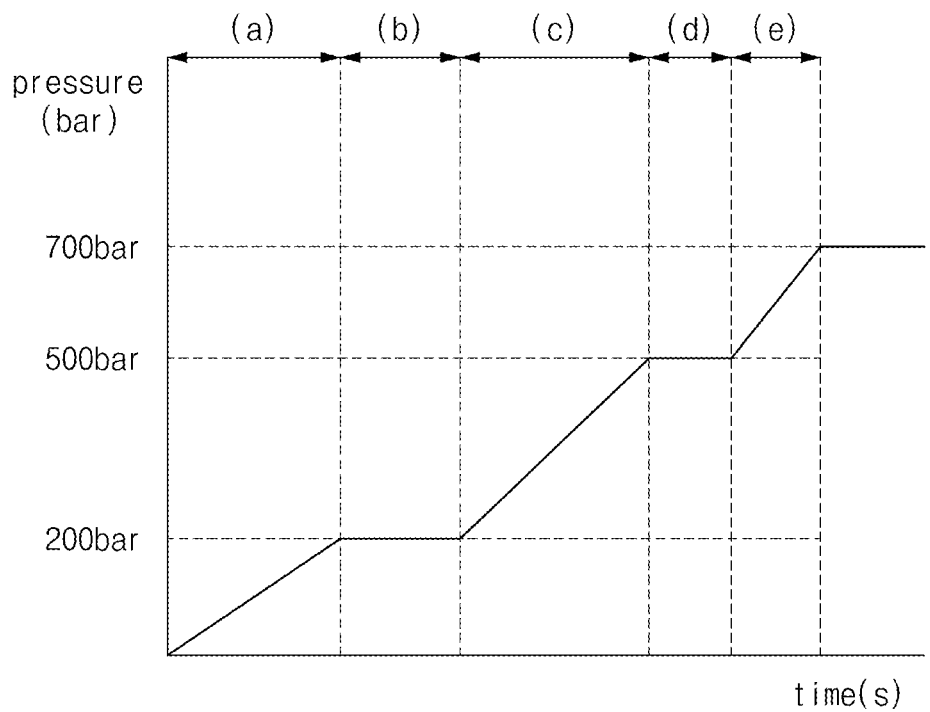
FIG. 3 is a graph illustrating one example showing, in a time series manner, a change in pressure in a flow path in a tube member over time when fuel is supplied to the fuel supply device from the outside.

FIG. 3 is a graph illustrating one example showing, in a time series manner, a change in pressure in the flow path in the tube member over time when fuel is supplied to the fuel supply device from the outside.

In the case in which the fuel supply device 10 is configured to receive hydrogen as fuel, the pressure of the hydrogen to be supplied to the fuel supply device 10 may vary over time when the hydrogen is supplied from the outside. For example, a hydrogen storage container configured to supply the hydrogen to the fuel supply device 10 may be divided into three hydrogen storage regions based on pressure of the stored hydrogen. The low-pressure hydrogen may be supplied to the fuel supply device 10 first, and the high-pressure state hydrogen may be gradually and sequentially supplied to the fuel supply device 10. Hereinafter, for example, the description will be focused on a configuration in which the hydrogen storage container includes i) a first hydrogen storage region for storing hydrogen at 200 bar, ii)

a second hydrogen storage region for storing hydrogen at 500 bar, and iii) a third hydrogen storage region for storing hydrogen at 700 bar.

Referring to FIGS. 1 to 3, when hydrogen begins to be supplied to the fuel supply device 10 in the first hydrogen storage region for storing hydrogen at 200 bar, the pressure in the flow path of the tube member 200 increases until reaching 200 bar, as illustrated in region (a) in FIG. 3. In this case, because the rate of change over time in pressure in the flow path is kept larger than a predetermined value in region (a) in FIG. 3, the piezoelectric element 310 generates electric power, the generated electric power is transmitted to the valve member 320 through the electric wire member 330, and the valve member 320 receiving the electric power closes the flow path of the tube member 200. Therefore, it is possible to prevent hydrogen from leaking from the inside of the regulator or the connection component 400 because of pulsation occurring during the process of supplying hydrogen through the first hydrogen storage region.

Thereafter, when the pressure in the flow path of the tube member 200 reaches 200 bar, the piezoelectric element 310 does not generate electric power any further, and the valve member 320 opens the flow path of the tube member 200 again. When the hydrogen is completely supplied through the first hydrogen storage region, the tube member 200 and the first hydrogen storage region are disconnected from each other, and the tube member 200 and the second hydrogen storage region are connected to each other. Region (b) in FIG. 3 shows a pressure state in the flow path of the tube member 200 until the tube member 200 and the second hydrogen storage region are completely connected to each other after the tube member 200 and the first hydrogen storage region are disconnected from each other.

Thereafter, when hydrogen begins to be supplied to the fuel supply device 10 in the second hydrogen storage region for storing hydrogen at 500 bar, a pressure in the flow path of the tube member 200 increases until reaching 500 bar, as illustrated in region (c) in FIG. 3. In this case, because the rate of change over time in pressure in the flow path is kept larger than the predetermined value in region (c) in FIG. 3, the piezoelectric element 310 generates electric power, the generated electric power is transmitted to the valve member 320 through the electric wire member 330, and the valve member 320 receiving the electric power closes the flow path of the tube member 200. Therefore, it is possible to prevent hydrogen from leaking from the inside of the regulator or the connection component 400 because of pulsation occurring during the process of supplying hydrogen through the second hydrogen storage region.

Thereafter, when the pressure in the flow path of the tube member 200 reaches 500 bar, the piezoelectric element 310 does not generate electric power any further, and the valve member 320 opens the flow path of the tube member 200 again. When the hydrogen is completely supplied through the second hydrogen storage region, the tube member 200 and the second hydrogen storage region are disconnected from each other, and the tube member 200 and the third hydrogen storage region are connected to each other. Region (d) in FIG. 3 shows a pressure state in the flow path of the tube member 200 until the tube member 200 and the third hydrogen storage region are completely connected to each other after the tube member 200 and the second hydrogen storage region are disconnected from each other.

Thereafter, when hydrogen begins to be supplied to the fuel supply device 10 in the third hydrogen storage region for storing hydrogen at 700 bar, a pressure in the flow path of the tube member 200 increases until reaching 700 bar, as illustrated in region (e) in FIG. 3. In this case, because the rate of change over time in pressure in the flow path is kept larger than the predetermined value in region (e) in FIG. 3, the piezoelectric element 310 generates electric power, the generated electric power is transmitted to the valve member 320 through the electric wire member 330, and the valve member 320 receiving the electric power closes the flow path of the tube member 200. Therefore, it is possible to prevent hydrogen from leaking from the inside of the regulator or the connection component 400 because of pulsation occurring during the process of supplying hydrogen through the third hydrogen storage region.

Figure 4:
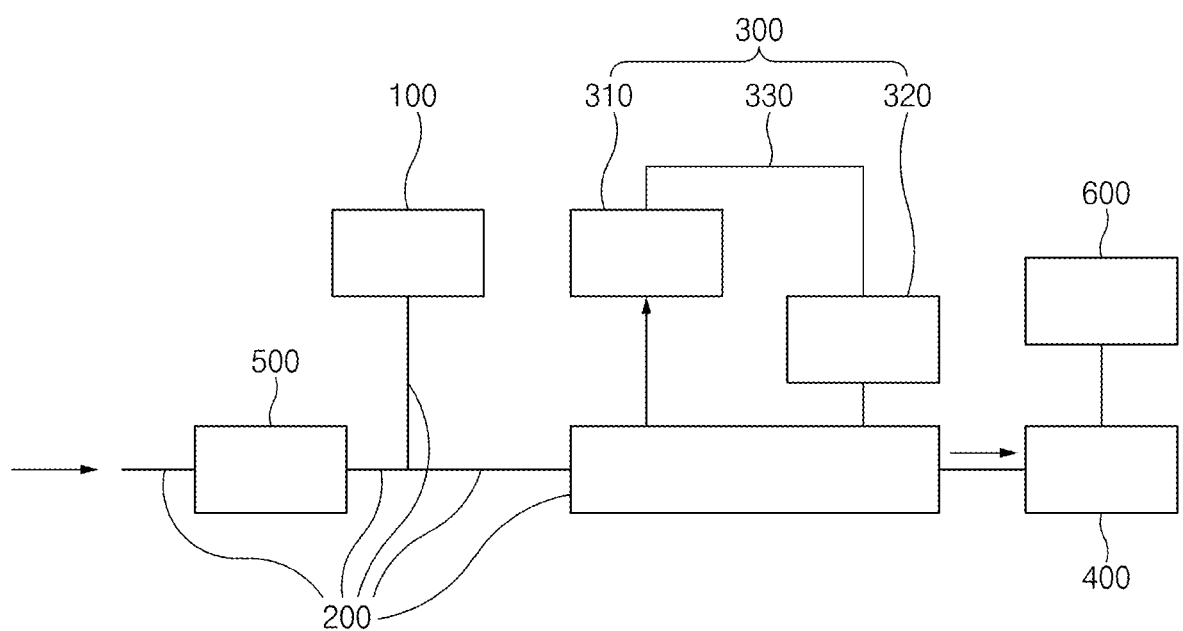
FIG. 4 is a view illustrating an example of a fuel supply device.

FIG. 4 is a view illustrating an example of a fuel supply device.

The above-mentioned contents of the fuel supply device described with reference to FIGS. 1 and 2 may be applied, without change, to the fuel supply device according to another implementation of the present disclosure. However, the fuel supply device according to another implementation of the present disclosure differs from the fuel supply device according to the above-mentioned implementation of the present disclosure in that the fuel supply device according to another implementation of the present disclosure further includes a check valve 500.

Referring to FIG. 4, the fuel supply device 10 may further include the check valve 500 coupled to the tube member 200. More specifically, the check valve 500 may be configured to cut off the discharge of fuel from the fuel tank 100 and the opening/closing control unit 300 to the outside while allowing the supply of the fuel from the outside to the fuel tank 100 and the opening/closing control unit 300. The check valve 500 is configured to allow only a unidirectional motion of a fluid.

In some examples, cases in which the fuel flowing through the flow path of the tube member 200 of the fuel supply device 10 applies a pressure to the opening/closing control unit 300 may broadly include i) a case in which fuel is supplied to the fuel tank 100 from the outside (i.e., the fuel tank is charged with the fuel), and ii) a case in which the fuel is supplied to a fuel demander (e.g., a fuel cell) from the fuel tank 100.

In some implementations, the fuel supply device 10 may further include a fuel demander 600 configured to receive fuel through the tube member 200. In addition, the opening/closing control unit 300 may be configured to close the flow path of the tube member 200 when a rate (dP/dt) of change over time in pressure applied to the opening/closing control unit 300 by the fluid flowing through the flow path at the time of supplying the fluid to the fuel tank 100 through the tube member 200 from the outside is higher than a rate (dP/dt) of change over time in pressure applied to the opening/closing control unit 300 by the fluid at the time of supplying the fluid to the fuel demander 600 through the tube member 200 from the fuel tank 100. This may be to close the flow path when a rate of change over time in pressure, which occurs during the process of charging the fuel tank 100 with fuel, is higher than a rate of change over time in pressure during the process of supplying fuel to the fuel demander 600 from the fuel tank 100.

In some examples, the fuel supply device 10 may be mounted in a vehicle, the vehicle may be a vehicle including a fuel cell, and the fuel supply device 10 may be configured to supply hydrogen to the fuel cell. In some implementations, the opening/closing control unit 300 may be configured to close the flow path of the tube member 200 when the rate (dP/dt) of change over time in pressure applied to the opening/closing control unit 300 by the fluid flowing through the flow path of the tube member 200 is 1 bar/s or higher. This configuration may be implemented by adopting the configuration in which a rate of change over time in pressure in the flow path of the tube member 200 of the fuel supply device 10 mounted in the vehicle during a process in which the vehicle travels is about 0.1 bar/s, and a rate of change over time in pressure in the flow path of the tube member 200 during the process of charging the fuel tank 100 of the fuel supply device 10 with hydrogen is about 3.3 bar/s. However, the above-mentioned numerical range is merely an example, and values of the rate (dP/dt) may be variously modified.

Figure 5:
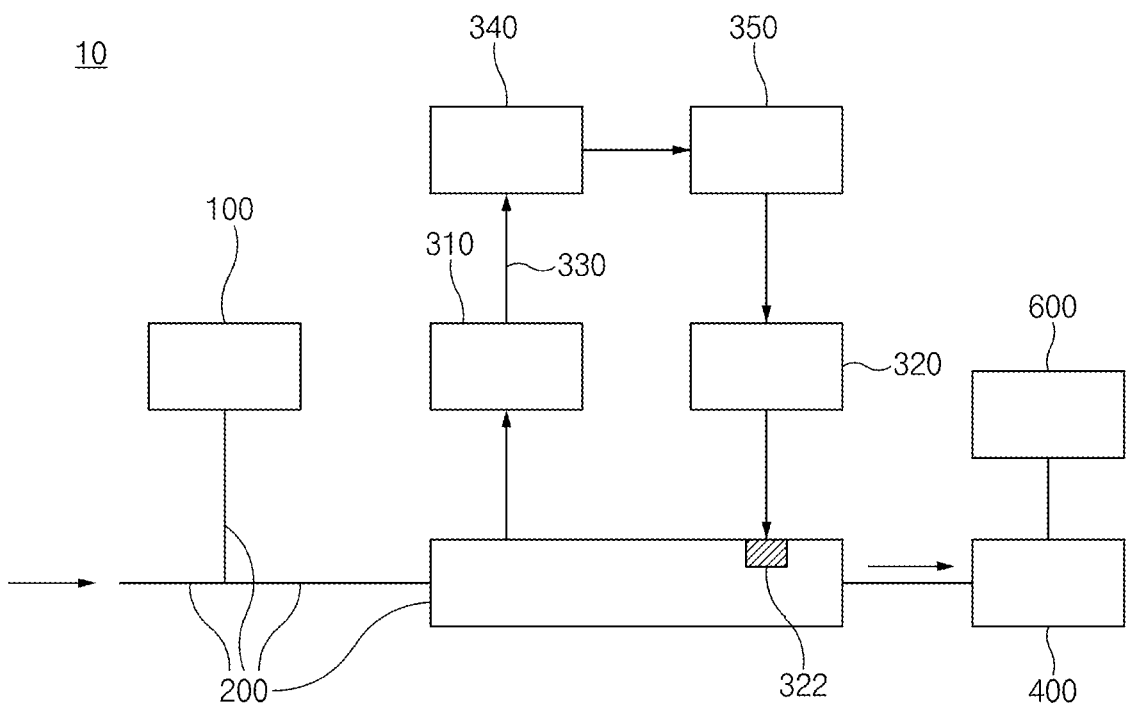
FIG. 5 is a view illustrating an example of a fuel supply.

FIG. 5 is a view illustrating an example of a fuel supply device.

The above-mentioned contents of the fuel supply devices according to the implementations of the present disclosure described with reference to FIGS. 1, 2, and 4 may be applied, without change, to the fuel supply device according to still another implementation of the present disclosure. However, the fuel supply device according to still another implementation of the present disclosure differs from the fuel supply devices according to the above-mentioned implementations of the present disclosure in that the fuel supply device according to still another implementation of the present disclosure may further include a controller and an electric power supply unit that will be described below.

Referring to FIG. 5, the fuel supply device 10 may further include a controller 340 and an electric power supply unit 350. The controller 340 may be configured to receive electric power when the piezoelectric element 310 generates the electric power. In some implementations, the electric wire member 330 may be configured to connect the piezoelectric element 310 and the controller 340. For example, the electric power supply unit 350 may be a battery such as a lithium-ion battery, but the type of electric power supply unit 350 is not limited thereto. In some examples, the controller 340 may include an electric circuit, a processor, or the like.

In addition, the fuel supply device 10 may further include the electric power supply unit 350 having one side connected to the controller 340 and the other side connected to the valve member 320. The electric power supply unit 350 may provide electric power for the valve member 320 to open or close the tube member 200.

In some implementations, when the rate (dP/dt) of change over time in pressure applied to the piezoelectric element 310 by the fluid flowing through the flow path in the tube member 200 is a predetermined value or higher, the piezoelectric element 310 generates electric power, and the electric power generated by the piezoelectric element 310 is transmitted, as a signal, to the controller 340 via the electric wire member 330. Based on the electric power provided from the piezoelectric element 310, the controller 340 determines that the flow path of the tube member 200 needs to be closed. According to the determination, the controller 340 transmits a signal to the electric power supply unit 350. The electric power supply unit 350, which receives the signal from the controller 340, supplies the electric power to the valve member 320, and the valve member 320 closes the flow path of the tube member 200. That is, unlike the above-mentioned implementations of the present disclosure, in some implementations, the electric power to be supplied to the valve member 320 may be electric power stored in the electric power supply unit 350 instead of electric power generated by the piezoelectric element 310.

In some implementations, a pressure sensor, instead of the piezoelectric element 310, may be provided as a component for measuring the rate (dP/dt) of change over time in pressure applied to the opening/closing control unit 300 by the fluid flowing through the flow path, unlike the above-mentioned configuration. In this case, the opening/closing control unit 300 may further include a pressure sensor, a controller connected to the pressure sensor and configured to receive a signal from the pressure sensor, and an electric power supply unit connected to the controller and configured to receive the signal from the controller. Similar to the piezoelectric element 310, the pressure sensor may also be connected to the tube member 200 and have one side connected to the flow path of the tube member 200.

In some implementations, when the rate (dP/dt) of change over time in pressure applied to the opening/closing control unit 300 by the fluid flowing through the flow path is the predetermined value or higher, i) the pressure sensor may transmit a signal to the controller, ii) the controller may transmit the signal to the electric power supply unit, iii) the electric power supply unit may supply electric power to the valve member 320, and iv) the valve member 320 may operate the close the flow path of the tube member 200 by receiving the electric power of the electric power supply unit.

The present disclosure has been described with reference to the limited implementations and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A fuel supply device comprising:
   a fuel tank that defines an internal space configured to store fuel;
   a tube member that defines a flow path configured to carry the fuel, the tube member having a first side connected to the fuel tank; and
   an opening/closing control unit coupled to the tube member and configured to open and close the flow path of the tube member,
   wherein the opening/closing control unit is configured to close the flow path of the tube member based on a rate (dP/dt) of pressure change of a fluid flowing through the flow path over time being greater than or equal to a predetermined value.

2. The fuel supply device of claim 1, wherein the opening/closing control unit comprises:
   a piezoelectric element connected to the flow path and configured to generate electric power based on the rate of pressure change of the fluid being greater than or equal to the predetermined value; and
   a valve electrically connected to the piezoelectric element and coupled to the tube member, the valve being configured to close the flow path of the tube member based on receiving the electric power generated by the piezoelectric element.

3. The fuel supply device of claim 2, wherein the opening/closing control unit further comprises an electric wire that electrically connects the piezoelectric element to the valve.

4. The fuel supply device of claim 2, wherein the valve comprises a solenoid valve, the solenoid valve comprising a plunger member configured to move relative to the tube member, and
   wherein the solenoid valve is configured to close the flow path by moving the plunger member based on receiving the electric power from the piezoelectric element.

5. The fuel supply device of claim 2, further comprising a regulator connected to a second side of the tube member.

6. The fuel supply device of claim 1, further comprising a connection component that is connected to a second side of the tube member, the connection component comprising a gastight seal.

7. The fuel supply device of claim 5, wherein the opening/closing control unit is coupled to a region of the tube member connecting between the fuel tank and the regulator, and
wherein the fuel tank, the opening/closing control unit, and the regulator are arranged along a flow direction of the fuel supplied from the fuel tank to the regulator.

8. The fuel supply device of claim 1, further comprising:
a fuel demander configured to receive the fuel through the tube member,
wherein the opening/closing control unit is configured to close the flow path of the tube member based on a first rate (dP/dt) of pressure change of the fluid supplied from an outside of the fuel tank to the fuel tank being higher than a second rate (dP/dt) of pressure change of the fluid supplied from the fuel tank to the fuel demander.

9. The fuel supply device of claim 1, wherein the predetermined value is 1 bar/s.

10. The fuel supply device of claim 5, wherein a first distance between the regulator and a first region of the tube member connected to the piezoelectric element is greater than a second distance between the regulator and a second region of the tube member connected to the valve.

11. The fuel supply device of claim 1, further comprising a check valve coupled to the tube member, the check valve being configured to:
block a discharge of the fuel from the fuel tank and the opening/closing control unit to an outside of the fuel supply device; and
allow a supply of the fuel from the outside of the fuel supply device to the fuel tank and the opening/closing control unit.

12. The fuel supply device of claim 1, wherein the opening/closing control unit comprises:
a piezoelectric element connected to the tube member and the flow path, the piezoelectric element configured to generate electric power based on the rate of pressure change of the fluid being greater than or equal to the predetermined value;
a controller connected to the piezoelectric element and configured to receive the electric power generated by the piezoelectric element;
a valve connected to the tube member; and
an electric power supply connected to the controller and the valve and configured to provide power to the valve to thereby open or close the flow path of the tube member,
wherein the piezoelectric element is configured to, based on the rate of pressure change of the fluid being greater than or equal to the predetermined value, generate the electric power and transmit the electric power to the controller,
wherein the controller is configured to transmit a signal to the electric power supply based on receiving the electric power from the piezoelectric element,
wherein the electric power supply is configured to supply the power to the valve based on receiving the signal from the controller, and
wherein the valve is configured to close the flow path of the tube member by the power received from the electric power supply.

13. The fuel supply device of claim 1, wherein the opening/closing control unit comprises:
a pressure sensor configured to measure a pressure of the fluid in the flow path;
a controller connected to the pressure sensor and configured to receive a sensor signal from the pressure sensor;
an electric power supply connected to the controller and configured to receive a control signal from the controller; and
a valve coupled to one side of the tube member and connected to the electric power supply,
wherein the pressure sensor is configured to transmit the sensor signal to the controller based on the rate of pressure change of the fluid being greater than or equal to the predetermined value,
wherein the controller is configured to transmit the control signal to the electric power supply based on receiving the sensor signal from the pressure sensor,
wherein the electric power supply is configured to supply electric power to the valve based on receiving the control signal from the controller, and
wherein the valve is configured to close the flow path of the tube member by the electric power received from the electric power supply.

* * * * *